United States Patent [19]

Khazai et al.

[11] Patent Number: 5,342,811
[45] Date of Patent: Aug. 30, 1994

[54] COMPOSITION AND METHOD FOR PRODUCING BORON CARBIDE/TITANIUM DIBORIDE COMPOSITE CERAMIC POWDERS USING A BORON CARBIDE SUBSTRATE

[75] Inventors: Bijan Khazai; William G. Moore, both of Midland, Mich.

[73] Assignee: The Dow Chemical Company, Midland, Mich.

[21] Appl. No.: 698,435

[22] Filed: May 10, 1991

Related U.S. Application Data

[62] Division of Ser. No. 198,969, May 26, 1988, Pat. No. 5,108,962.

[51] Int. Cl.$^5$ .................. C04B 35/56; C04B 35/58
[52] U.S. Cl. ........................... 501/87; 501/96
[58] Field of Search ............... 501/87, 96; 427/215; C04B 35/56, 35/58

[56] References Cited

U.S. PATENT DOCUMENTS

| | | | |
|---|---|---|---|
| 2,613,154 | 10/1952 | Montgomery | 501/87 |
| 4,379,852 | 4/1983 | Watanabe et al. | 501/87 |
| 4,670,408 | 6/1987 | Petzon et al. | 501/87 |
| 4,957,884 | 9/1990 | Knudsen et al. | 501/87 |
| 5,047,372 | 9/1991 | Parrish et al. | 501/87 |

FOREIGN PATENT DOCUMENTS 0115720 8/1984 European Pat. Off. ..... C04B 35/58

Primary Examiner—Karl Group
Assistant Examiner—Chris Gallo
Attorney, Agent, or Firm—B. J. Tribble; D. R. Howard

[57] ABSTRACT

A composition and method for producing boron carbide/titanium diboride composite ceramic powders is disclosed. The process comprises the ordered steps of (a) intimately mixing as reactants boron carbide and a titanium source, such that the average reactant particle size is less than about 20 microns and substantially all discrete reactant areas are less than about 50 microns, and (b) reacting the product of step (a) under conditions sufficient to produce a boron carbide/titanium diboride composite ceramic powder wherein at least a portion of the boron carbide particles form substrates to which at least a portion of the titanium diboride particles are attached. The method can be used to produce a composite ceramic powder having boron carbide and titanium diboride particles less than about 20 microns in diameter. This powder can then be densified using known densification techniques to form a densified part wherein the titanium diboride grains have an average size of less than about 20 microns in diameter and the boron carbide grains having an average size of less than about 50 microns.

3 Claims, No Drawings

COMPOSITION AND METHOD FOR PRODUCING BORON CARBIDE/TITANIUM DIBORIDE COMPOSITE CERAMIC POWDERS USING A BORON CARBIDE SUBSTRATE

This is a divisional of application Ser. No. 198,969 filed May 26, 1988 now U.S. Pat. No. 5,108,962.

FIELD OF THE INVENTION

The present invention relates to the field of ceramic powders. More particularly, it relates to a method for producing ceramic powders and the ceramic powders and densified ceramic compositions produced therefrom.

BACKGROUND OF THE INVENTION

In recent years there has been much interest in composite ceramic materials. This is because some composite materials possess properties which are significantly improved over the properties of the individual constituents. These ceramic composites, including both fiber-reinforced and multicomponent structures, have been targeted as applicable to a variety of scientific and technological uses. Some of these uses include tooling applications, indenters, nozzles, and so forth. For these and other uses the desirable material should be as lightweight and as tough as possible however, the attainment of one of these properties has in many cases been accomplished at the expense of the other property.

Boron carbide has been found to exhibit excellent hardness and a relatively low specific gravity, but it lacks toughness ($K_{Ic}=3.6$ MN/m$^{3/2}$). Titanium diboride, on the other hand, is nearly as hard and much tougher when compared with boron carbide, but it is also much heavier. Because of the potentially complementary properties of these two materials, researchers have directed attention to producing composites comprising both compounds. Results of this research indicate that a ceramic produced therefrom approximates titanium diboride's toughness and exceeds boron carbide's hardness while maintaining a low specific gravity. For example, U.S. Pat. No. 2,613,154 discloses the manufacture of titanium diboride/boron carbide composites from a mixture of titanium powder and boron-rich boron carbide powder. This method does not, however, appear to be suitable for producing a variety of titanium diboride/boron carbide compositions without the incorporation of excess carbon or boron in the densified piece. The same problem is encountered in connection with research done by Russian workers, as disclosed in E. V. Marek, "Reaction of Boron Carbide with Group IV Transition Metals of the Periodic Table," *Mater. Izdeliya. Poluchaemye Metodom Poroshk. Metall., Dokl. Nauchn. Konf. Aspir. Molodykh Issled. Inst. Probl. Materialoved. Akad. Nauk Ukr. SSR*, 6th, 7th, Meeting Date 1972-1973, 156-9. This paper describes mixtures of boron, carbon and titanium which are hot-pressed to composites comprising B$_4$C and TiB$_2$ phases. A microhardness superior to that of either B$_4$C or the borides is reported.

Japanese Patent Application 1985-235764 discloses boron carbide/titanium diboride composites prepared by dispersing boron carbide powder and titanium diboride powder in organic solvents such as toluene, and ball milling using a tungsten carbide-cobalt alloy as a milling medium. This material is then dried and cold-pressed. The authors report an extreme hardness for a sintered piece prepared from 40 to 50 percent titanium diboride.

U.S. Pat. No. 4,029,000 discloses a boron carbide/titanium diboride composite, prepared from a physical mixture of boron carbide and titanium diboride powders, for use as an injection pump for molten metals. The particle diameter is in the range of 2 to 6 $\mu$m for the boron carbide and 5 to 15 $\mu$m for the titanium diboride. The hardness attained upon sintering is reported to be lower than that of boron carbide alone.

Research has also been directed toward other composites comprising titanium, boron and carbon. For example, the literature also describes various methods of preparing composite materials comprising titanium carbide and titanium borides. Among these are, e.g., U.S. Pat. No. 4,138,456 and 3,804,034, which describe preparation of a TiC/TiB$_2$ composite and a TiC/TiB/B$_4$C composite, respectively, produced from physical mixtures of powders. U.S. Pat. No. 4,266,977 discloses preparation of a composite prepared in a plasma reactor from an "intimate" mixture of the three constituents.

An important factor in the ultimate utility of a ceramic composite is the degree to which the constituents are dispersed. To realize the maximum benefit of a particulate composite, the components should be uniformly distributed on a microscopic scale. However, such uniform distribution is at best extremely difficult to attain in physical mixtures, such as those produced using any of various milling techniques, in part because of agglomeration of component particles. Physical mixtures are defined as mixtures of components in which the starting and ending components are the same. This is in contrast with the in situ production of ending components by various means.

A further consideration in producing an "ideal" composite material relates to particle size. This is because the high incidence of failure in engineered ceramic parts can often be attributed to small cracks or voids which result from incomplete packing of the precursor powders. A solution to this problem would be to use extremely fine composite powders that are substantially uniform as to particle diameter. Such powders would pack more tightly and thereby reduce the number of void spaces formed in the ceramic body. It has been suggested, by E. A. Barringer and H. K. Bowen in "Formation, Packing and Sintering of Monodispersed TiO$_2$ Powders," *J. Amer. Ceram. Soc.* 65, C-199 (1982), that an "ideal" ceramic powder for producing a high quality part would be of high purity and contain particles which are substantially spherical, nonagglomerated, and both fine and uniform in size.

As a ceramic powder is sintered, adjacent particles fuse into grains. In general, the grain size is governed by the particle size of the powder from which the part is prepared. Thus, the sintering of finer particles presents the opportunity to produce fine-grained bodies. This is especially important in TiB$_2$/B$_4$C composites, in which the TiB$_2$ and B$_4$C grain sizes are preferably less than or equal to about 20 microns in order to maximize the hardness and toughness of the composite. Thus, the particle sizes should preferably be significantly smaller than 20 microns. The effect of grain size on the integrity of boron carbide bodies having no titanium diboride constituent has been investigated by A. D. Osipov et al., "Effect of Porosity and Grain Size on the Mechanical Properties of Hot-Pressed Boron Carbide," *Sov. Powder Metall. Met. Ceram.* (Engl. Transl.) 21(1), 55-8 (1982).

The authors disclose that parts exhibiting a fine grain size are stronger than parts consisting of coarse grains.

In order to produce the desired particle sizes, especially in the under −20 micron range, it is often necessary to mill the powder. While milling does promote size reduction, it is time consuming, may impart impurities such as metals, and does not decrease size beyond a certain point, even with additional milling time. This point depends on both the substance being milled and the chosen milling technique. See, e.g., W. Summers, "Broad scope particle size reduction by means of vibratory grinding, *Ceramic Bulletin* 62(2) (1983) 12–215. For most techniques boron carbide, a hard substance, reaches its minimum size at around 1 micron in diameter using attrition milling techniques. Further steps, such as acid leach and washing steps, may be required subsequent to milling in order to increase purity of the product.

Thus, what is needed is a method of producing a composite titanium diboride/boron carbide ceramic powder that is fine, uniform and of high purity, and which shows a high degree of mixing of the constituents. The method should reduce or eliminate the need for extended milling or purification procedures subsequent to production.

SUMMARY OF THE INVENTION

The present invention provides a method of producing a boron carbide/titanium diboride composite ceramic powder comprising the ordered steps of: (a) intimately mixing as reactants boron carbide and a titanium source such that the average reactant particle size is less than about 20 microns and there are substantially no discrete reactant areas greater than about 50 microns; and (b) reacting the product of step (a) under conditions sufficient to produce a boron carbide/titanium diboride composite ceramic powder. A densified part prepared from this powder and having a microstructure characterized by titanium diboride grains having an average size of less than about 20 microns and boron carbide grains having an average size of less than about 50 microns is also provided.

The present invention further provides a ceramic composite powder consisting essentially of boron carbide and titanium diboride, the boron carbide and titanium diboride comprising particles averaging less than about 20 microns in diameter, at least a portion of the boron carbide particles forming substrates to which at least a portion of the titanium diboride particles are attached. The present invention also provides a densified ceramic part prepared from this powder.

Finally, the present invention also provides a densified composite ceramic part consisting essentially of boron carbide and titanium diboride wherein the boron carbide and titanium diboride grains show a dispersion which can be characterized as having an average coefficient of variation of the area percent of the minor phase, over a titanium diboride concentration range of from about 0.1 percent to about 99.9 percent, which is less than 10, as determined by scanning electron microscopic analysis of 20 fields measuring 26×26 microns each at a magnification of 778×. It can be further characterized as having an average range of the area percent of the minor phase that is less than 9.

DESCRIPTION OF THE PREFERRED EMBODIMENTS

The present invention provides a composition of a boron carbide/titanium diboride composite ceramic powder having a novel association between the particles of boron carbide and titanium diboride. It further provides a densified part, showing a unique microstructure, which can be prepared from the powder composition. Finally, it provides a method of preparing the powder, this method being both fast and economical.

The powder composition is novel in that there is a physical attachment between the boron carbide particles and the titanium diboride particles. This physical attachment is due to the fact that the titanium diboride particles are formed in situ, on the surface of the boron carbide particles, having as their boron source the boron in the boron carbide particles. Thus, the boron carbide forms a substrate for the physically attached titanium diboride particles. This associational level means that, at relatively comparable concentration levels, individual boron carbide particles will be to a significant extent surrounded by the generally smaller titanium diboride particles. This level of association tends to both preclude agglomeration of the titanium diboride particles, and maximize the potential for crack deflection by the titanium diboride particles in a densified part prepared from the composite powder.

There are a number of possible reactant choices within the scope of the invention as claimed. The term "boron carbide" is used generically to encompass any boron carbide, including the various non-stoichiometric boron carbides such as boron-rich boron carbides. For example, $B_4C$, $B_8C$, $B_{13}C_2$, $B_{25}C$, and mixtures thereof are all within the scope of the invention. Of these, $B_4C$ is preferred. The titanium source can preferably be titanium in any reducible form, or it can be a reduced titanium source. Thus, reducible or reduced forms such as $TiO$, $TiO_2$, $Ti_2O_3$, $TiO_2$, $Ti_3O_5$, $TiC$, $TiN$, $TiH_2$, $Ti$, and reduced titanium halides are preferred, and more preferred is $TiO_2$. If a reducible titanium source is used it is necessary to use as a third reactant a reducing agent suitable to reduce the titanium source. This reducing agent is preferably a carbon source, and more preferably elemental carbon, such as carbon black, acetylene carbon black, graphite, or a mixture thereof; a hydrocarbon; a carbohydrate, such as a sugar, starch, or a mixture thereof. Of these, carbon black and acetylene carbon black are more preferred. The reducing agent can also be a hydrogen source such as hydrogen gas or a hydrocarbon. If a reduced titanium source is selected, it is preferable to use a boron-rich boron carbide in order to minimize the presence of free carbon in the product.

The method for producing the boron carbide/titanium diboride ceramic composite powder of one embodiment of the present invention is essentially a two-step process in which the individual reactants are first mixed and then heated. The initial mixing step is important in ensuring maximum distribution of the reactants, particularly of the titanium source and, if needed, the reducing agent, to obtain the maximum distribution of the physically associated and attached boron carbide/titanium diboride particles. This mixing can be done using either a dry mixing or wet mixing method as known to the skilled artisan. In general the wet mixing method is preferred, using aqueous or other media in order to suspend the starting materials. Dry mixing, using for example ball-mills or agitation equipment, can also be performed. If dry mixing is done it is preferred to use polymeric or compatible ceramic mixing media rather than metallic media in order to reduce the introduction of impurities into the mixture. The goal is to mix the constituents "intimately," the term "intimate" being defined as a degree of association such that light microscopy or general elemental analytical techniques, such as, for example, electron dispersive spectroscopy, transmission electron microscopy, and carbon/oxygen analysis, preferably reveal that substantially all individual discrete areas of reactants are less than about 50 microns in diameter, more preferably less than about 25 microns, and most preferably less than about 10 microns. "Substantially" as used herein means that at least about 85 percent of discrete areas fall within the maximum preferred diameters.

In view of the preference for relatively small discrete concentrations of reactants, there is also an inherent preferred maximum average particle size for the mixed materials. The preferred particle size after the mixing is done is such that the average boron carbide particle size is less than about 20 microns, more preferably less than about 10 microns, and most preferably less than about 1 micron. It is preferred to use pre-comminuted powders in order to reduce the introduction of impurities; however, it is also possible to use a boron carbide powder that prior to mixing exhibits a larger particle size and then mix by a ball-milling technique, such that the particle sizes are reduced at the same time as the areas of discrete concentrations are reduced. Similarly, it is preferred that the post-mixed titanium source particle size is less than about 20 microns, more preferred that it is less than 10 microns, and most preferred that it is less than about 1 micron.

It should also be noted that it is possible, and preferred, to deagglomerate the reactants prior to the mixing step. This helps to increase the degree of mixing possible. Deagglomeration can be done, for example, by a prior jet-milling or ball-milling step.

Once the constituent powders have been intimately mixed the next step is to react them under conditions sufficient to form the boron carbide/titanium diboride composite ceramic powder showing the desired associational level in which the titanium source reacts with some of the boron in the boron carbide and forms titanium diboride on the boron carbide substrate. This is preferably done by heating. In the case of using a reducible titanium source and a reducing agent such as a carbon source, the heating induces the carbothermal reduction of the titanium source with the carbon and boron carbide and subsequent formation of $TiB_2$. This heating is preferably done under an inert or reaction-compatible atmosphere, which is preferably selected from the group consisting of argon, helium, neon, hydrogen, carbon monoxide, xenon, krypton, and mixtures thereof, with argon being more preferred. Appropriate stoichiometric adjustments may be advisable when using a reaction-compatible gas such as carbon monoxide or other gases and a reducible titanium source such as titanium dioxide or the suboxides or halides thereof, because of the resultant reduction of a portion of the titanium source by the gas.

The heating is done at a temperature preferably above about 1000° C., and more preferably from about 1200° C. to about 2000° C. Still more preferred is a range of from about 1500° C. to about 1800° C., and most preferred is a range of from about 1600° C. to about 1750° C. Temperatures that are too low may result in either very slow or incomplete reaction, while temperatures that are too high encourage grain growth, thus making a very fine powder less likely to be produced. The time period generally required to effect the reaction in the most preferred temperature range, i.e., from about 1600° C. to about 1750° C., is preferably on the order of about 10 to about 15 minutes for powder quantities of about 30 grams or less; however, longer time periods may be needed for lower temperatures and greater quantities of reactants. Variations in powder depths also require appropriate heating time adjustments. In batch reactions it is helpful to monitor the reaction by gas chromatography using a carbon monoxide detector, which will show a drop in the carbon monoxide concentration when the carbothermal reduction has been completed and the yield therefore maximized.

The heating can be done using equipment generally known to those skilled in the art. A graphite crucible, for example, can be employed as a carrier for the reactants through a standard-type induction furnace. Alternatively, the heating can be performed in a resistance-heated furnace, wherein the crucible is moved through the furnace at a rate determined by the length of the passage and the desired reaction time. A fixed crucible can also be used.

An advantage of the present method is that, because of the reaction involved, it is possible to "purify" the composite powder concurrently with producing it. "Purify" as used herein refers to the substantial elimination of excess reactants present in the product. This purification can be accomplished by adjustment of the stoichiometry of the desired reaction. For example, in the case of a reaction using $TiO_2$ and elemental carbon as reactant sources, an "idealized" reaction sequence would be:

$$(1+x)B_4C + 2TiO_2 + 3C = xB_4C + 2TiB_2 + 4CO$$

In the above equation, x is the mole percent of $B_4C$ not converted to $TiB_2$. However, in some cases there will be stoichiometric deviations in the boron or carbon phases, such as for example where a portion of the boron carbide is a boron-rich or carbon-rich boron carbide. In this case it is possible for those skilled in the art to analyze the boron carbide prior to mixing, in order to determine its stoichiometry, and then adjust the titanium oxide and/or carbon concentration accordingly to ensure maximization of yield as well as purity. Similar adjustments can be made in order to produce a purer product when different titanium and, when needed, reducing agent sources are selected.

The final boron carbide/titanium diboride powder produced by the method of one embodiment of the present invention will preferably show the composition of another embodiment of the present invention, i.e., one in which there is a physical attachment of the titanium diboride particles on the surfaces of the boron carbide particles, the boron carbide particles thus serving as substrates. The overall composition of the powder can vary, from 0.1 percent boron carbide and 99.9 percent titanium diboride, to its converse, 0.1 percent titanium diboride and 99.9 percent boron carbide. It will be understood that the proportion of the constituents will obviously have an effect on determinations of mixing level in the powder, as well as distribution in a densified part prepared from this powder.

An advantage of the present invention is that, by careful control of time and temperature and because of the way the titanium diboride forms on the boron carbide substrate, it is possible to obtain an individual titanium diboride particle no greater than the maximum initial boron carbide particle size. Thus, control of the boron carbide particle size in turn enables control of the maximum titanium diboride particle size.

The composite ceramic powder of the present invention is suitable for use in preparing a densified part that will show a novel microstructure. Methods of densification are known to the skilled artisan, and can include hot pressing, hot isostatic pressing, sintering, and so forth. The densified part, like the powder, can be from about 0.1 to about 99.9 weight percent boron carbide and from about 99.9 to about 0.1 weight percent titanium diboride. Where the titanium diboride content is very significant, grain growth of the boron carbide during the densification process tends to be inhibited because there is sufficient titanium diboride to allow for substantial isolation of the boron carbide. This inhibition of grain growth of the boron carbide in general tends to improve the crack deflection capability of the final densified part.

The densified part, because of the powder from which it is made, shows a very uniform distribution of titanium diboride and boron carbide grains. It is preferred that the microstructure of the densified part shows substantially all of the titanium diboride grains are less than about 20 microns in diameter, more preferably less than about 5 microns, and most preferably less than about 2 microns. It is also preferred that the boron carbide grains are less than about 50 microns in diameter, more preferably less than about 20 microns, and most preferably less than about 10 microns. The grain size of the part is partially determined by the particle size of the composite powder, which is in turn partially determined by the particle size of the reactant powders. Thus control of the particle size of the starting boron source helps to predetermine the grain size in the densified piece.

It is further preferred that the dispersion level of the titanium diboride and boron carbide grains can be characterized as having an average coefficient of variation of the area percent of the minor phase, over a titanium diboride concentration range of from about 0.1 percent to about 99.9 percent, which is less than or equal to about 10, as determined by scanning electron microscopic analysis of 20 fields measuring 26×26 microns each at a magnification of 778×. This is more preferably less than or equal to about 5. The coefficient of variation can be defined as the value representing the standard deviation divided by the average of the area percent of the minor phase. Analysis of the 778× magnification fields at a magnification of at least 3,000× improves accuracy. The dispersion can preferably be further characterized as having a range of the area percent of the minor phase which is less than 9, as determined by scanning electron microscopic analysis at a magnification of 778× of 20 fields measuring 26×26 microns each. This range is more preferably less than about 5. Range is defined as the average of the differences between the high and low values of the area percent of either constituent in each field, taken over the 20 fields as described above.

The following examples are given to illustrate and not to limit the scope of the invention. All parts and percentages are by weight unless otherwise stated.

EXAMPLE 1

About 5.89 g of titanium dioxide; about 22.8 g of submicron boron carbide assaying as 94.64 weight $B_4C$ containing 3.1 percent free carbon, 1.11 percent oxygen, 1.02 percent nitrogen and 6.69 percent excess boron; and a quantity of carbon weighing 1.19 g are made into a slurry under high agitation and then heated to a thick paste. The still wet mass is transferred to a circulating air drying oven at 105° C. and dried overnight. The resulting cake is gently crushed to a powder weighing 29.28 g. Examination by light microscope reveals that substantially all boron carbide and titanium source particles are less than about 20 microns in diameter, and substantially all individual discrete reactant areas are less than about 50 microns in diameter.

About 15 g of the precursor is placed in a graphite crucible and inserted into an induction furnace. The chamber is evacuated and subsequently kept under flowing argon gas. The sample is then heated to 1650° C. over a period of 30 minutes and maintained at temperature for 10 minutes. The furnace is then turned off and the sample allowed to cool under flowing argon gas. A black product weighing 12.69 g, i.e., about 84.06 percent of the initial 15.0 g of precursor, is obtained and is determined to be a composite of $B_4C/TiB_2$ by X-ray diffractometry. X-ray mapping of the composite by energy dispersive spectroscopy indicates a uniform distribution of the titanium component throughout the sample. The sample is further analyzed by transmission electron microscopy, which indicates well-formed crystallites covering the surfaces of boron carbide particles. Examination of the composite powder by optical microscope also indicates that particles covering the surface produce color reflections that are different from that of boron carbide, appearing to be titanium diboride. Examination of the powder indicates that most titanium diboride grains are less than 1 micron in diameter, and are distributed along the boron carbide boundaries.

A portion of this sample is hot-pressed at 2100° C. and 5,000 psi pressure. It's dispersion level can be characterized as having a coefficient of variation of the area percent of the minor phase of about 6, when 20 fields measuring 26×26 microns each are examined by scanning electron microscopy at 778×. Total titanium diboride concentration is calculated to be about 20 percent. The analysis of each field is done at a magnification of 3,000×.

Comparative Experiment 1

In comparison to the fine microstructure obtained using the process of the present invention, a physical mixture of submicron titanium diboride and submicron boron carbide in similar proportions, i.e., about 19 percent titanium diboride and about 81 percent boron carbide, which is ultrasonically treated to deagglomerate it prior to hot pressing under similar conditions, gives essentially coarse grains of up to about 10 microns in diameter. In that scanning electron micrograph the titanium diboride is shown as the light phase.

EXAMPLE 2

About 5.74 g of titanium dioxide, 21.88 g of boron carbide, and 1.56 g of carbon are wet mixed under high agitation and concurrently dried. The boron carbide initially has an average particle size of 4 microns and assays as 99.36 percent $B_4C$ containing 0.13 percent nitrogen, 0.51 percent oxygen, and 4.2 percent excess boron. The precursor thus formed weighs 28.85 g. About 15 g of this precursor is heated to 1600° C. in an induction furnace under an argon atmosphere. After cooling under flowing argon a black powder is obtained, weighing about 12.79 g. This is shown to be a composite of titanium diboride and boron carbide by X-ray diffractometry. X-ray mapping of the sample by energy dispersive spectroscopy further indicates a uniform distribution of titanium throughout the powder. A dense part is prepared from the powder using methods known to those skilled in the art. Examination of the microstructure of the part indicates a distribution of fine grains of $TiB_2$ in the $B_4C$ matrix.

Comparative Experiment 2

The following Table 1 shows a comparison of the coefficients of variation (C/V) of the area percent titanium diboride for densified parts produced from a powder of the present invention's process and of physically mixed composite powders having comparable percents of titanium diboride. In the physically mixed powders the starting powders are submicron boron carbide and titanium diboride powders. To prepare a physically mixed powder the boron carbide is dispersed in methanol and the dispersion then sonicated 1 minute. Then the titanium diboride is added and the dispersion is again sonicated 1 minute. The product is then dried, crushed, and sieved to $-100$ mesh. The table includes the coefficient of variation data from Example 1 and Comparative Experiment 1, as well as coefficients of variation for parts showing other titanium diboride loadings.

TABLE 1

| Coefficients of Variation of the Minor Phase | | | | | | | |
|---|---|---|---|---|---|---|---|
| | Percent Titanium Diboride | | | | | | |
| | 10% | 20% | 30% | 50% | 70% | 75% | 90% |
| In Situ Process C/V | — | 6 | 25 | 4 | — | 7 | — |
| Physically Mixed C/V | 52 | 66 | 31 | 25 | 14.1 | — | 12.7 |

— Indicates no data obtained

Table 2 shows a comparison of the ranges for parts prepared from a physically mixed powder and a powder of the present invention at comparable loadings.

TABLE 2

| | Wt. % $TiB_2$ | | Area % $TiB_2$ | | |
|---|---|---|---|---|---|
| | As mixed | From area % | Mean ± σ | Range | C/V |
| Physically Mixed C/V | 19 | 17.0 | 10.2 ± 6.7 | 24.1 (0.5 to 24.6) | 66 |
| In Situ Process C/V | 20 | 19.6 | 11.9 ± 0.6 | 2.5 (10.6 to 13.1) | 5 |

σ Indicates a standard deviation

It will be seen that the process of the present invention produces in general significantly lower coefficients of variation, as determined by scanning electron microscopic analysis at 778× of 20 fields measuring 26×26 microns each. The exception, which is a densified part having an area percent of titanium diboride of 30 and a coefficient of variation for the carbothermal process of 25, is believed to be unexpectedly high due to insufficient mixing of the boron carbide in the first step of the process. The range is also substantially less for parts produced from the process and powder of the present invention.

EXAMPLE 3

Raw materials of the same chemistry and stoichiometry as shown in Example 2 are mixed dry and about 15.00 g of the resulting powder is heated in an induction furnace and under flowing argon to about 1600° C. for about 5 minutes. Upon cooling a black powder weighing 12.82 g is obtained and identified as a composite of $TiB_2$ and $B_4C$ by X-ray diffractometry. Microscopic examination of the microstructure of a dense part reveals a distribution of fine titanium diboride grains, about 1 micron in diameter, situated in a boron carbide matrix.

EXAMPLE 4

About 5.74 g of titanium dioxide, 22.18 g of boron carbide, and 1.45 g of carbon are dry mixed to give 29.13 g of precursor powder. The boron carbide initially has an average particle size of 2 microns and assays as 97.95 percent $B_4C$ containing 0.12 percent nitrogen, 0.96 percent oxygen, 0.25 percent free carbon, and 1.76 percent excess boron. About 15.01 g of this powder is heated as described in Example 2 to 1600° C. for about 10 minutes and subsequently cooled. A black powder weighing 12.79 g is obtained and gives an X-ray diffraction pattern corresponding to a $TiB_2/B_4C$ composite.

EXAMPLE 5

About 33.37 lbs of titanium dioxide, 41.25 lbs of boron carbide, and 5.4 lbs of carbon black are mixed in a plastic lined mill using polymeric milling media to prevent contamination. The boron carbide has an average particle size of 2 microns and assays as 21.58 percent total carbon including 0.6 percent free carbon, 1.17 percent oxygen and 0.24 percent nitrogen. The sample is then loaded into graphite boats a half-inch deep and calcined in a graphite heated tunnel kiln under a flowing argon atmosphere at a temperature of 1740° C. for about 50 minutes. The fine powder obtained is subjected to a mild jet milling operation to break up and mix in any soft agglomerates. Examination of the powder by X-ray diffractometry indicates the formation of $TiB_2/B_4C$ composites which by chemical analysis are shown to be composed of 50 percent by weight titanium diboride and 50 percent by weight boron carbide.

We claim:

1. A composite ceramic powder consisting essentially of boron carbide and titanium diboride particles averaging less than about 20 microns in diameter, at least a portion of the boron carbide particles forming substrates to which at least a portion of the titanium diboride particles are physically attached.

2. The ceramic powder of claim 1 wherein the particles are less than about 10 microns in diameter.

3. The ceramic powder of claim 1 wherein the particles are less than about 1 micron in diameter.

* * * * *